(12) United States Patent
Yoshioka et al.

(10) Patent No.: US 10,742,279 B2
(45) Date of Patent: Aug. 11, 2020

(54) USER TERMINAL AND WIRELESS COMMUNICATION METHOD

(71) Applicant: NTT DOCOMO, INC., Tokyo (JP)

(72) Inventors: Shohei Yoshioka, Tokyo (JP); Satoshi Suyama, Tokyo (JP); Jun Mashino, Tokyo (JP); Tatsuki Okuyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/476,770

(22) PCT Filed: Nov. 24, 2017

(86) PCT No.: PCT/JP2017/042280
§ 371 (c)(1),
(2) Date: Jul. 9, 2019

(87) PCT Pub. No.: WO2018/131299
PCT Pub. Date: Jul. 19, 2018

(65) Prior Publication Data
US 2019/0363765 A1   Nov. 28, 2019

(30) Foreign Application Priority Data
Jan. 11, 2017  (JP) .................................. 2017-002338

(51) Int. Cl.
| H04B 7/0456 | (2017.01) |
| H04B 7/0452 | (2017.01) |
| H04B 7/06 | (2006.01) |
| H04L 5/00 | (2006.01) |
| H04L 25/02 | (2006.01) |

(52) U.S. Cl.
CPC ......... *H04B 7/0456* (2013.01); *H04B 7/0452* (2013.01); *H04B 7/0617* (2013.01); *H04L 5/0048* (2013.01); *H04L 25/0202* (2013.01)

(58) Field of Classification Search
CPC .. H04B 7/0452; H04B 7/0617; H04B 7/0619; H04B 7/05; H04B 7/0842; H04B 7/086
See application file for complete search history.

(56) References Cited

U.S. PATENT DOCUMENTS

2018/0048363 A1*  2/2018  Okuyama ............ H04B 7/0456

OTHER PUBLICATIONS

International Search Report issued in PCT/JP2017/042280 dated Jan. 30, 2018 (5 pages).

(Continued)

*Primary Examiner* — Kevin Kim
(74) *Attorney, Agent, or Firm* — Osha Liang LLP

(57) ABSTRACT

In user terminal 20, communication section 202 receives a data signal to which precoding based on first channel information indicating a channel between radio base station 10 and user terminal 20 estimated in first channel estimation and beamforming are applied. The first channel information is an equivalent channel matrix including a beamforming weight. Stage-2 channel estimation section 205 performs second channel estimation for estimating second channel information indicating a channel between radio base station 10 and user terminal 20. The second channel information is an equivalent channel matrix including the beamforming weight and a precoding matrix. Postcoding section 207 performs postcoding on the data signal based on the second channel information.

7 Claims, 11 Drawing Sheets

(56) References Cited

OTHER PUBLICATIONS

Written Opinion of the International Searching Authority issued in PCT/JP2017/042280 dated Jan. 30, 2018 (3 pages).
Obara, T. et al.; "Joint Processing of Analog Fixed Beamforming and CSI-Based Precoding for Super High Bit Rate Massive MIMO Transmission Using Higher Frequency Bands"; IEICE Transactions on Communications, vol. E98-B, No. 8, Aug. 2015, pp. 1474-1481 (8 pages).

* cited by examiner

ововаuser terminal and wireless communication method...

USER TERMINAL AND WIRELESS COMMUNICATION METHOD

TECHNICAL FIELD

The present invention relates to a user terminal and a radio communication method.

BACKGROUND ART

In a UMTS (Universal Mobile Telecommunications System) network, Long Term Evolution (LTE) is specified for a higher data rate, lower latency, and the like. For a broader bandwidth and a higher speed based on LTE, successor systems of LTE are also studied (for example, the systems are called LTE-A (LTE-Advanced), FRA (Future Radio Access), 5G (5th generation mobile communication system), 5G+(5G plus), and New-RAT (Radio Access Technology)).

In a radio communication system of the future (for example, 5G), the use of Massive MIMO (Multiple Input Multiple Output) using a large number of antenna elements (for example, more than 100 elements) in a high frequency band (for example, 5 GHz or higher) is studied to further increase the speed and reduce the interference in signal transmission.

An example of a technique for controlling beams or streams in the MIMO includes digital precoding and digital postcoding (hereinafter, may be simply referred to as precoding and postcoding), such as Eigen mode (EM) transmission using singular value decomposition (SVD) and block diagonalization (BD).

However, in the precoding and postcoding, the number of reference signals (RS) for estimating channel information (for example, CSI (Channel State Information)) indicating a channel (propagation path) between a radio base station and a user terminal and the amount of operation increase in proportion to the number of antenna elements. Therefore, a reduction in the number of reference signals and the amount of operation is attempted to realize the Massive MIMO (for example, see NPL 1).

CITATION LIST

Non-Patent Literature

NPL 1: T. Obara et al.: "Joint Processing of Analog Fixed Beamforming and CSI-based Precoding for Super High Bit Rate Massive MIMO Transmission Using Higher Frequency Bands," IEICE Transactions on Communications VOL. E98-B, NO. 8 Aug. 2015

SUMMARY OF INVENTION

Technical Problem

However, acquisition of all channel information necessary for precoding processing and postcoding processing is not studied in NPL 1.

An aspect of the present invention is to provide a user terminal and a radio communication method that can acquire all channel information necessary for precoding and postcoding processing.

Solution to Problem

An aspect of the present invention provides a user terminal in a radio communication system that performs precoding and postcoding, and beamforming in MU-MIMO transmission performed between a radio base station and a plurality of user terminals, the user terminal including: a communication section that receives a data signal to which the precoding based on first channel information indicating a channel between the radio base station and the user terminal and the beamforming are applied, the channel being estimated in estimated in first channel estimation, the first channel information being an equivalent channel matrix including a beamforming weight; a channel estimation section that performs second channel estimation for estimating second channel information indicating a channel between the radio base station and the user terminal, the second channel information being an equivalent channel matrix including the beamforming weight and a precoding matrix; and a postcoding section that performs the postcoding on the data signal based on the second channel information.

Advantageous Effects of Invention

According to the aspect of the present invention, all of the channel information necessary for the precoding and postcoding processing can be acquired.

DESCRIPTION OF EMBODIMENTS

Figure 1:
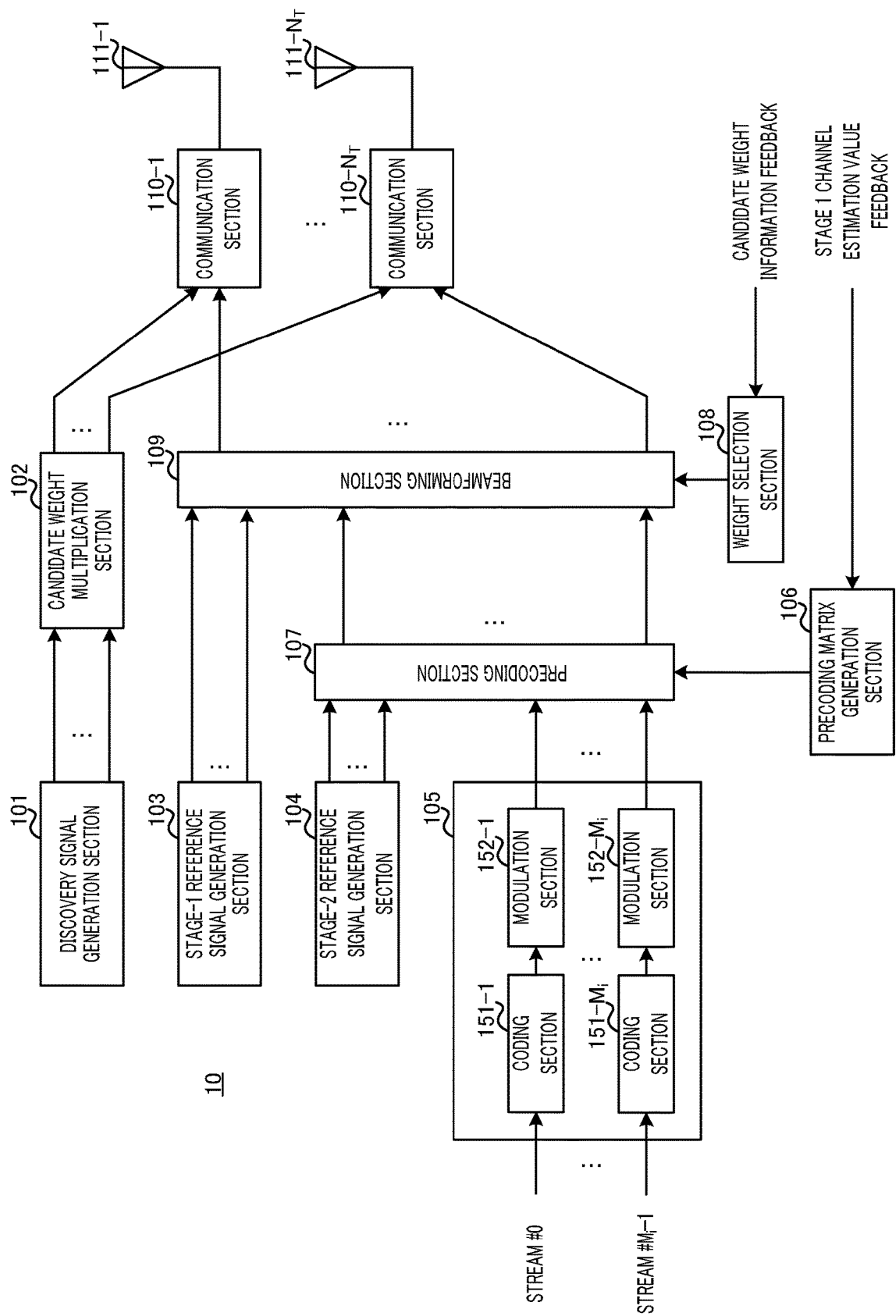
FIG. 1 is a block diagram showing a configuration example of a radio base station according to Embodiment 1.

Hereinafter, embodiments of the present invention will be described in detail with reference to the accompanying drawings.

Streams are distributed and multiplexed for a plurality of user terminals in MU-MIMO (Multi-User MIMO) transmission in the case described below. BF and precoding/postcoding are performed in Massive MIMO in the case described below. Therefore, precoding/postcoding and beamforming are performed in the MU-MIMO transmission between a radio base station and a plurality of user terminals in a radio communication system according to the present invention.

Furthermore, precoding is performed for an inter-user interference (IUI), and precoding and postcoding are performed for an inter-stream interference (ISI) in each user terminal.

In an example illustrated below, the radio base station includes $N_T$ antenna elements and performs Massive MIMO transmission in the downlink between the radio base station and $N_U$ user terminals. The number of antenna elements of an i-th (i=1 to $N_U$) user terminal is $N_{Ri}$, and the number of streams is $M_i$.

In this case, reception signal r received by each user terminal is expressed by the following equation 1.

(Equation 1)

$$r = \begin{bmatrix} r_0 \\ r_1 \\ \vdots \\ r_{N_U-1} \end{bmatrix} = \begin{bmatrix} H_0 \\ H_1 \\ \vdots \\ H_{N_U-1} \end{bmatrix} W P^{IUI} P^{ISI} \begin{bmatrix} d_0 \\ d_1 \\ \vdots \\ d_{N_U-1} \end{bmatrix} + z \quad [1]$$

$$= \begin{bmatrix} \tilde{H}_0 P_0^{ISI} & & 0 \\ & \tilde{H}_1 P_1^{ISI} & \\ & & \ddots \\ 0 & & \tilde{H}_{N_U-1} P_{N_U-1}^{ISI} \end{bmatrix} \begin{bmatrix} d_0 \\ d_1 \\ \vdots \\ d_{N_U-1} \end{bmatrix} + z$$

Here, $H_i$ (i=0 to $N_U-1$) represents channel information (channel matrix) of the i-th user terminal multiplexed in the MU-MIMO transmission, W represents a BF weight, $P^{IUI}$ represents a precoding matrix for the inter-user interference, $P^{ISI}$ represents a precoding matrix for the inter-stream interference, $d_i$ (i=0 to $N_U-1$) represents a stream for i-th user terminal 20, and z represents noise.

As shown in equation 1, the preceding ($P^{IUI}$) (for example, block diagonalization) processing for the inter-user interference orthogonalizes the channels between the user terminals and prevents the inter-user interference.

Signal y obtained by postcoding of reception signal r received by each user terminal is expressed by the following equation 2.

(Equation 2)

$$y = \begin{bmatrix} y_0 \\ y_1 \\ \vdots \\ y_{N_U-1} \end{bmatrix} = \begin{bmatrix} B_0^{ISI} r_0 \\ B_1^{ISI} r_1 \\ \vdots \\ B_{N_U-1}^{ISI} r_{N_U-1} \end{bmatrix} = \text{diag}( \ldots ) \begin{bmatrix} d_0 \\ d_1 \\ \vdots \\ d_{N_U-1} \end{bmatrix} + \tilde{z} \quad [2]$$

In equation 2, $B_i^{ISI}$ (i=0 to $N_U-1$) represents a postcoding matrix of the inter-stream interference for the i-th user terminal. Therefore, precoding matrix $P^{ISI}$ and postcoding matrix $B^{ISI}$ orthogonalize the channels between the streams of each user terminal and prevent the inter-stream interference.

In this case, the radio base station needs to acquire equivalent channel information (equivalent channel matrix) (for example, $H_i W$ of equation 1) including the BF weight to calculate precoding matrices ($P^{IUI}$, $P^{ISI}$) used in the precoding processing. The user terminal needs to acquire equivalent channel information (equivalent channel matrix) (for example, $H_i W P^{IUI} P^{ISI}$ of equation 1) including the BF weight and the precoding matrix to calculate postcoding matrix ($B^{ISI}$) used in the postcoding processing.

However, the equivalent channel matrix including the BF weight is used to generate precoding matrices ($P^{IUI}$, $P^{ISI}$) and postcoding matrix ($B^{ISI}$) in NPL 1, and as described above, the estimation of the equivalent channel matrix including the BF weight and the precoding matrix for generating postcoding matrix ($B^{ISI}$) is not studied. Therefore, the acquisition of all of the channel information necessary for the precoding and postcoding processing is not studied in NPL 1.

Therefore, a method of acquiring all of the channel information necessary for the precoding and the postcoding will be described in the following embodiments. Specifically, the radio base station and the user terminal perform channel estimation divided into two stages including processing of estimating the equivalent channel information including the BF weight for generating the precoding matrix (hereinafter, referred to as "channel estimation of stage 1") and processing of estimating equivalent channel information including the BF weight and the precoding matrix for generating the postcoding matrix (hereinafter, referred to as "channel estimation of stage 2").

Embodiment 1

<Radio Communication System>

Figure 2:
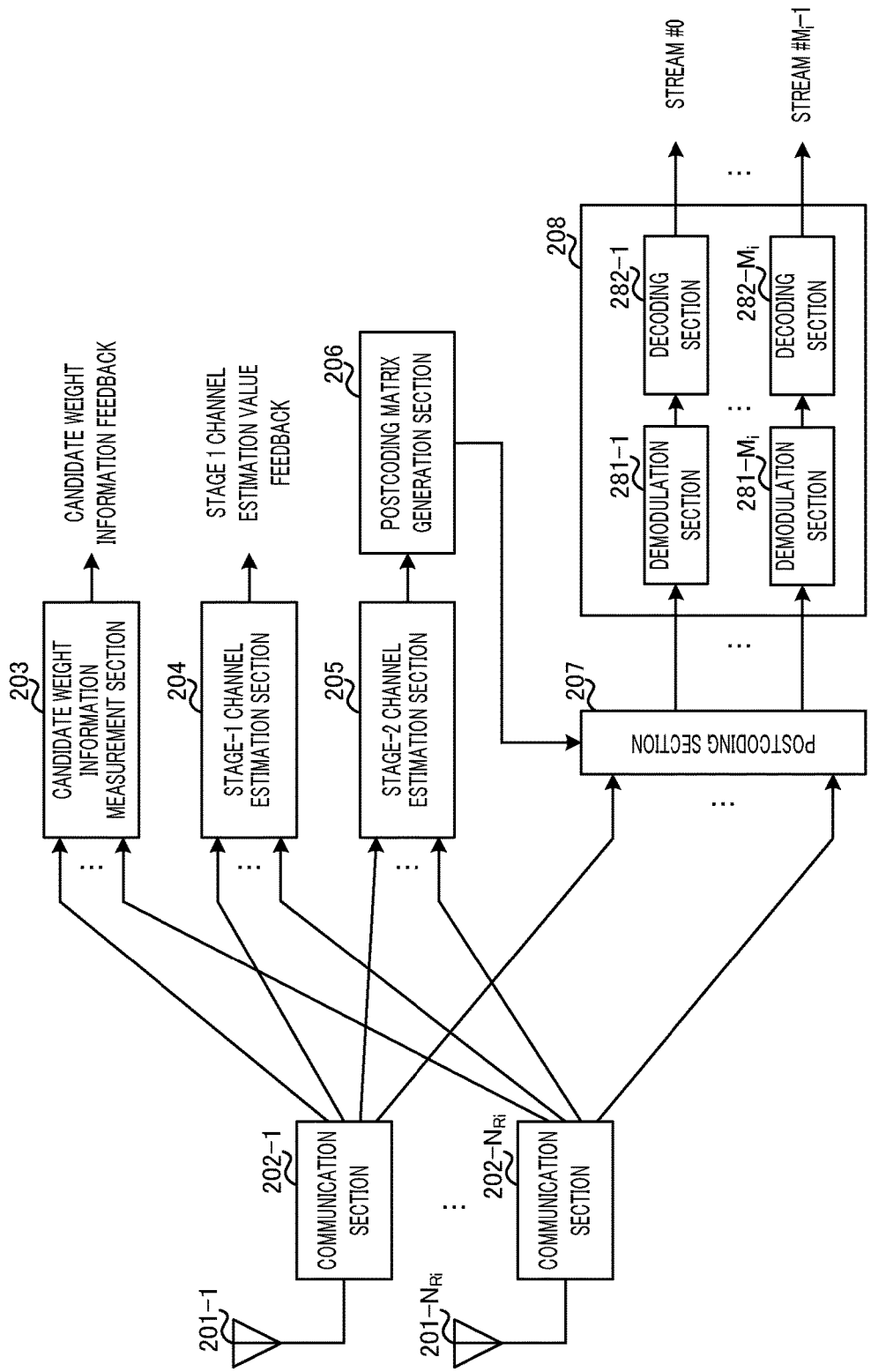
FIG. 2 is a block diagram showing a configuration example of a user terminal according to Embodiment 1.

The radio communication system according to the present embodiment at least includes radio base station 10 shown in FIG. 1 and at least one user terminal 20 shown in FIG. 2. Each user terminal 20 is connected to (accesses) radio base station 10.

<Radio Base Station>

FIG. 1 illustrates an example of an overall configuration of the radio base station according to the present embodiment. Radio base station 10 shown in FIG. 1 includes discovery signal generation section 101, candidate weight multiplication section 102, stage-1 reference signal generation section 103, stage-2 reference signal generation section 104, data generation section 105, precoding matrix generation section 106, precoding section 107, weight selection section 108, beamforming section 109, communication sections 110, and antennas 111.

Note that constituent sections (for example, IFFT processing section and CP adding section) and the like for generating an OFDM (Orthogonal Frequency Division Multiplexing) signal in radio base station 10 are not illustrated in FIG. 1.

Discovery signal generation section 101 generates discovery signals (reference signals) for deciding BF weight (W). For example, discovery signal generation section 101 generates at least the same number of discovery signals as the number of candidates of the BF weight. Discovery signal generation section 101 outputs the generated discovery signals to candidate weight multiplication section 102.

Candidate weight multiplication section 102 multiplies the discovery signals input from discovery signal generation section 101 by the candidates of the BF weight, respectively, and outputs the discovery signals multiplied by the BF weight candidates to communication sections 110.

Stage-1 reference signal generation section 103 generates a reference signal (hereinafter, referred to as "first reference signal") used in the channel estimation of stage 1 (first channel estimation) and outputs the first reference signal to beamforming section 109.

Stage-2 reference signal generation section 104 generates a reference signal (hereinafter, referred to as "second reference signal") used in the channel estimation of stage 2 (second channel estimation) and outputs the second reference signal to precoding section 107.

Data generation section 105 generates data (downlink signals) for a plurality of user terminals 20. Although the configuration of data generation section 105 for one user terminal 20 (i-th user terminal 20) is illustrated in FIG. 1, radio base station 10 includes data generation sections 105 respectively corresponding to a plurality of ($N_U$) user terminals 20.

Data generation section 105 includes coding sections 151 and modulation sections 152. Coding sections 151 and modulation sections 152 are provided according to the number of streams ($M_i$) for user terminal i. Each coding section 151 encodes data signals of $M_i$ streams, and each modulation section 152 modulates the encoded data signals and outputs the modulated data signals to precoding section 107. Note that the code rate and the modulation scheme in each coding section 151 and each modulation section 152 may be different in each stream.

Precoding matrix generation section 106 generates precoding matrices using a channel estimation value of stage 1 fed back from user terminal 20. The channel estimation value of stage 1 is, for example, channel information (HW) indicating the equivalent channel matrix including BF weight (W). Specifically, precoding matrix generation section 106 generates precoding matrix ($P^{IUI}$) for removing the interference between a plurality of user terminals 20 (inter-user interference) multiplexed in the MU-MIMO and precoding matrix ($P^{ISI}$) for removing the interference between a plurality of streams (inter-stream interference) in each user terminal 20. Precoding matrix generation section 106 outputs generated precoding matrices (($P^{IUI}$, $P^{ISI}$), hereinafter, may also be collectively expressed as "P") to precoding section 107.

In the channel estimation of stage 2, precoding section 107 multiplies the second reference signal input from stage-2 reference signal generation section 104 by precoding matrix (P) input from precoding matrix generation section 106 and outputs the second reference signal after the precoding to beamforming section 109.

In the data transmission, precoding section 107 multiplies the data signal input from data generation section 105 by precoding matrix (P) and outputs the data signal after the precoding to beamforming section 109. For example, precoding section 107 applies precoding to the data signals of M streams to generate L (the number of beams, for example, L>M) signals.

Weight selection section 108 selects BF weight (W) to be used for the beamforming from the BF weight candidates based on the candidate weight information fed back from user terminal 20 and outputs BF weight (W) to beamforming section 109. Note that an SNR (Signal to Noise Ratio) will be described as an example of the candidate weight information. For example, weight selection section 108 may select, in descending order of SNR, L BF weights not overlapping with each other.

In the channel estimation of stage 1, beamforming section 109 multiplies the first reference signal input from stage-1 reference signal generation section 103 by BF weight W input from weight selection section 108 and outputs the first reference signal after the BF weight multiplication to communication section 110. The processing allows each user terminal 20 to estimate equivalent channel information (HW) including the BF weight using the first reference signal multiplied by BF weight (W) decided based on the candidate weight information (SNR).

In the channel estimation of stage 2, beamforming section 109 multiplies the second reference signal input from precoding section 107 by BF weight (W) input from weight selection section 108 and outputs the second reference signal after the BF weight multiplication to communication section 110. The processing allows each user terminal 20 to estimate equivalent channel information (HWP) including precoding matrix (P) and BF weight (W) using the second reference signal multiplied by precoding matrix (P) and BF weight (W).

In the data transmission, beamforming section 109 multiplies the data signals input from precoding section 107 by BF weight (W) input from weight selection section 108 and outputs the data signals ($N_T$ signals) after the BF weight multiplication to communication sections 110.

Communication sections 110-1 to 110-$N_T$ are provided according to $N_T$ antennas 111 (antenna elements), respectively. Each communication section 110 performs transmission processing, such as D/A conversion and up-conversion, on the input signal. Communication sections 110 multiplex the signals after the transmission processing based on, for example, time-division, frequency-division, or code-division multiplexing and transmit the signals from $N_T$ antennas 111, respectively. Specifically, each communication section 110 transmits the discovery signal input from candidate weight multiplication section 102 to each user terminal 20 through antenna 111. In the channel estimation, communication section 110 transmits the first reference signal or the second reference signal input from beamforming section 109 to each user terminal 20 through antenna 111. In the data transmission, communication section 110 transmits the signal of the stream input from beamforming section 109 to each user terminal 20 through antenna 111.

<User Terminal>

FIG. 2 illustrates an example of an overall configuration of the user terminal according to the present embodiment. User terminal 20 shown in FIG. 2 includes antennas 201, communication sections 202, candidate weight information measurement section 203, stage-1 channel estimation section 204, stage-2 channel estimation section 205, postcoding matrix generation section 206, postcoding section 207, and data processing section 208. Note that stage-1 channel estimation section 204 and stage-2 channel estimation section 205 may constitute one channel estimation section.

Note that FIG. 2 shows an example of the configuration of i-th user terminal 20. Constituent sections (for example, CP removing section and FFT processing section) and the like for receiving the OFDM signal in user terminal 20 are not illustrated in FIG. 2.

Communication sections 202-1 to 202-$N_{Ri}$ are provided according to $N_{Ri}$ antennas 201, respectively. Each communication section 202 performs reception processing, such as down-conversion and A/D conversion, on the reception signals received through antenna 201. Here, examples of the reception signals include the discovery signal, the first reference signal, the second reference signal, and the data signal. Communication section 202 outputs the discovery signal to candidate weight information measurement section 203, outputs the first reference signal to stage-1 channel estimation section 204, outputs the second reference signal to stage-2 channel estimation section 205, and outputs the data signal to postcoding section 207.

Candidate weight information measurement section 203 measures the candidate weight information (SNR here) using the discovery signals input from communication sections 202. Note that the discovery signals are multiplied by the BF weight candidates, respectively. Therefore, candidate weight information measurement section 203 measures the SNR for each BF weight candidate used. The measured SNR is fed back to radio base station 10 (weight selection section 108) through, for example, communication section 202.

Stage-1 channel estimation section 204 performs, using the first reference signal input from communication section 202, the channel estimation of stage 1 for estimating the channel estimation value of stage 1 (first channel information) indicating the channel between radio base station 10 and user terminal 20. Note that the first reference signal is multiplied by BF weight (W) in radio base station 10 (beamforming section 109). Therefore, stage-1 channel estimation section 204 estimates equivalent channel information including the BF weight (equivalent channel matrix HW). Estimated channel information (HW) is fed back to radio base station 10 (precoding matrix generation section 106) through, for example, communication section 202.

Stage-2 channel estimation section 205 performs, using the second reference signal input from communication section 202, the channel estimation of stage 2 for estimating the channel estimation value of stage 2 (second channel information) indicating the channel between radio base station 10 and user terminal 20. Note that the second reference signal is multiplied by precoding matrix (P) and BF weight (W) in radio base station 10 (precoding section 107 and beamforming section 109). Therefore, stage-2 channel estimation section 205 estimates equivalent channel information (equivalent channel matrix HWP) including precoding matrix (P) and the BF weight. Stage-2 channel estimation section 205 outputs estimated channel information (HWP) to postcoding matrix generation section 206.

Postcoding matrix generation section 206 generates postcoding matrix ($B^{ISI}$) using channel information (HWP) input from stage-2 channel estimation section 205. Postcoding matrix generation section 206 outputs the generated postcoding matrix to postcoding section 207.

Postcoding section 207 performs postcoding of the data signal input from communication section 202 using postcoding matrix ($B^{ISI}$) input from postcoding matrix generation section 206. Postcoding section 207 outputs the data signal after the postcoding to data processing section 208.

Data processing section 208 performs reception processing on the data signal input from postcoding section 207 and obtains a plurality of streams for i-th user terminal 20. Data processing section 208 includes demodulation sections 281 and decoding sections 282. Demodulation sections 281 and decoding sections 282 are provided according to the number of streams ($M_i$) for i-th user terminal 20. Each demodulation section 281 demodulates the data signals of $M_i$ streams, and each decoding section 282 decodes the demodulated data signals to obtain $M_i$ streams. Note that the code rate and the modulation scheme in each demodulation section 281 and each decoding section 282 may be different in each stream.

<Operation of Radio Base Station 10 and User Terminal 20>

Next, operation of radio base station 10 and user terminal 20 will be described in detail.

Figure 3:
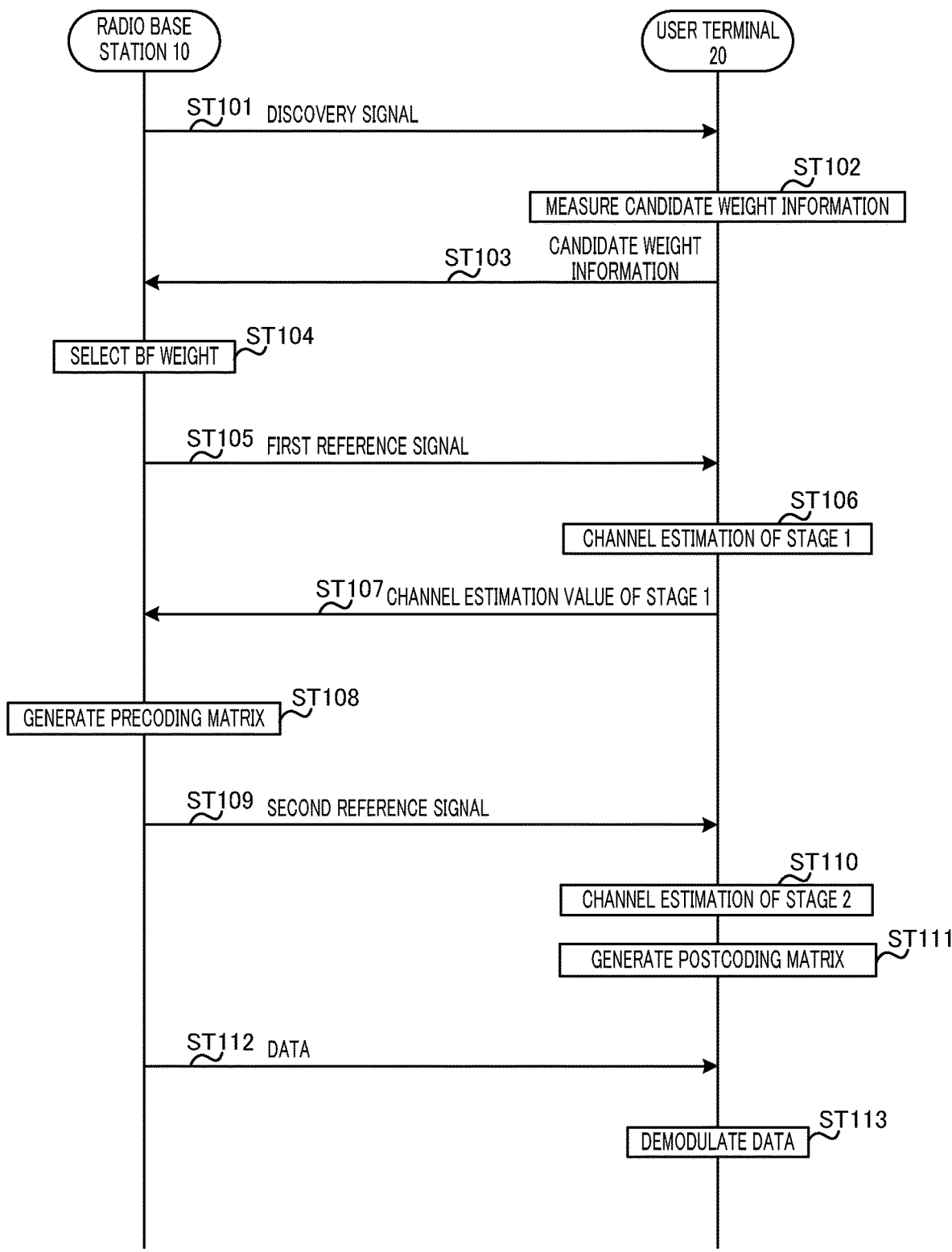
FIG. 3 is a sequence diagram showing an operation example of the radio base station and the user terminal according to Embodiment 1.
Figure 4:
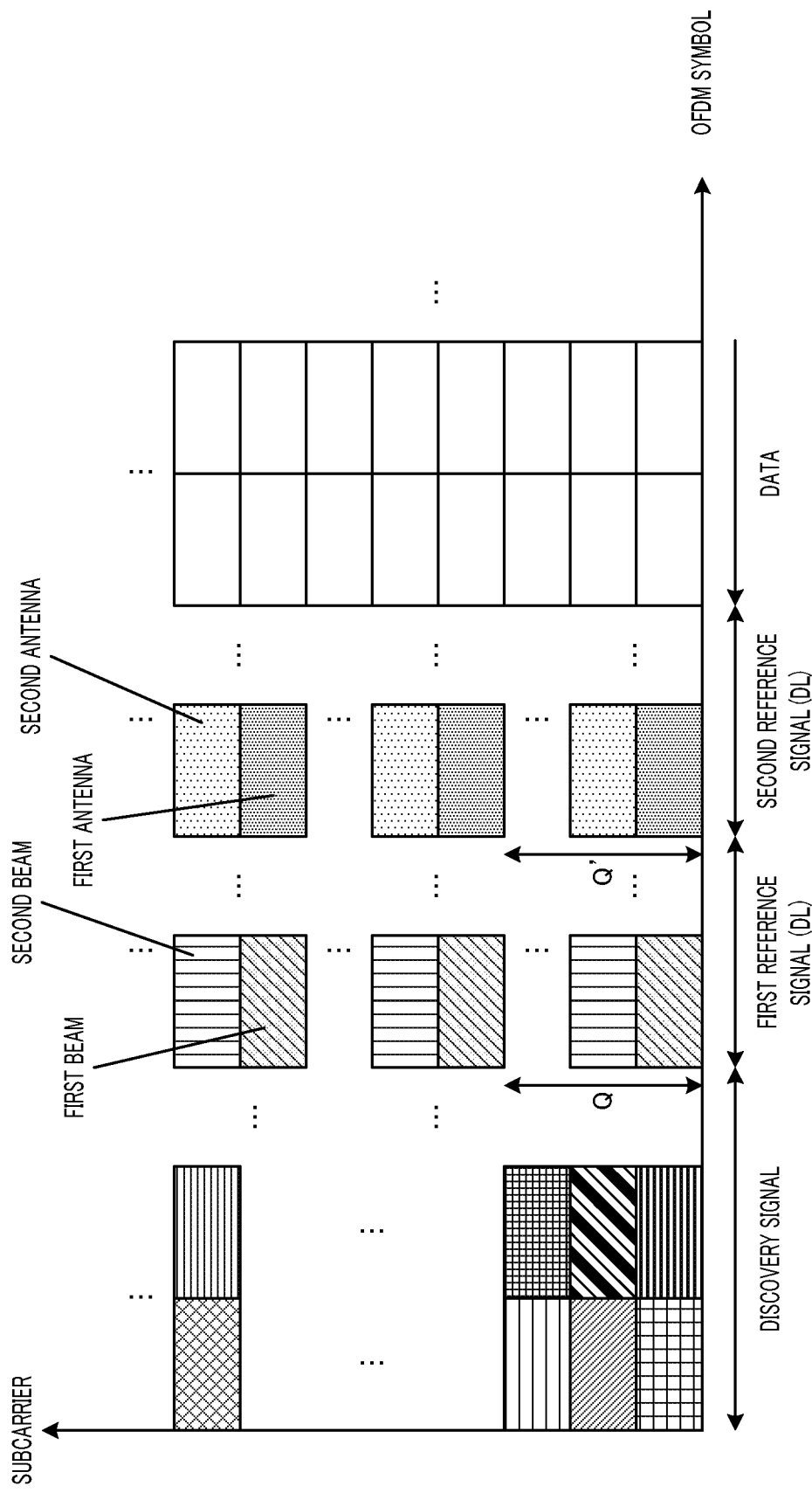
FIG. 4 illustrates a frame configuration example according to Embodiment 1.

FIG. 3 is a sequence diagram illustrating operation of radio base station 10 and user terminal 20 according to the present embodiment. FIG. 4 illustrates a frame configuration example in the present embodiment.

First, radio base station 10 transmits the discovery signals to user terminal 20 (ST101). The discovery signals are multiplied by the candidates of BF weight (W), respectively. The discovery signals transmitted for the candidates of the BF weight are not preceded, and the discovery signals are transmitted to all of the antennas 201 of all of the user terminals 20. For example, as shown in FIG. 4, the discovery signals corresponding to a plurality of BF weight candidates may be assigned to the radio resources (subcarriers) in one OFDM symbol based on frequency-division multiplexing or may be assigned to a plurality of OFDM symbols based on time-division multiplexing. In this way, the method of multiplexing and transmitting the discovery signals to the radio resources allows radio base station 10 to efficiently select the BF weight described later.

Next, user terminal 20 measures the candidate weight information (for example, SNR) corresponding to each candidate of the BF weight using the discovery signals (ST102). User terminal 20 then feeds back the measured candidate weight information (SNR) to radio base station 10 (ST103).

Radio base station 10 selects the BF weight to be used for beamforming from the BF weight candidates using the fed back candidate weight information (SNR) (ST104).

Next, radio base station 10 multiplies the first reference signals by selected BF weight (W) and transmits the first reference signals multiplied by the BF weight to user terminal 20 (ST105). For example, as shown in FIG. 4, the first reference signals corresponding to beams (for example, first beam, second beam, . . . ) formed by using the BF weight may be assigned to the radio resources (for example, subcarriers) based on the frequency-division multiplexing such that the first reference signals are orthogonal among the beams.

Next, user terminal 20 estimates channel information (HW) (that is, channel estimation of stage 1) using the first reference signals (ST106).

Figure 5B:
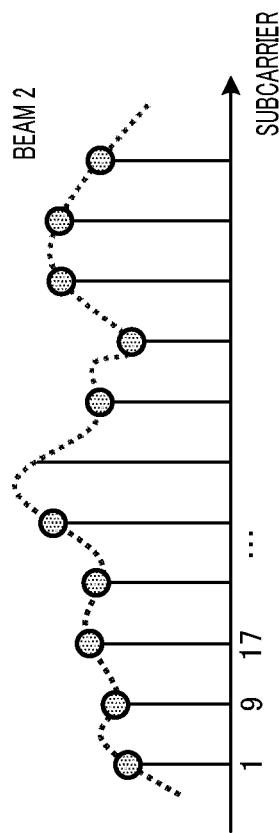
FIG. 5B illustrates an example of channel estimation processing for beam 2 according to Embodiment 1.
Figure 5A:
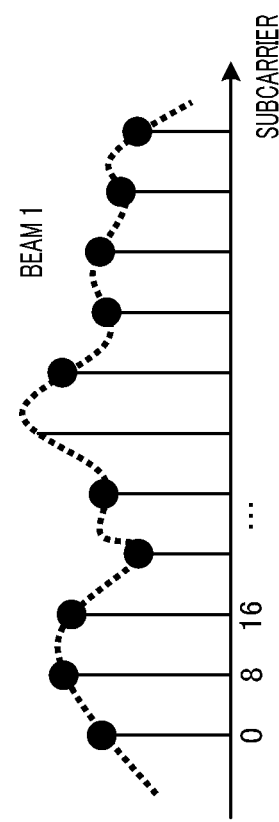
FIG. 5A illustrates an example of channel estimation processing for beam 1 according to Embodiment 1.
Figure 6B:
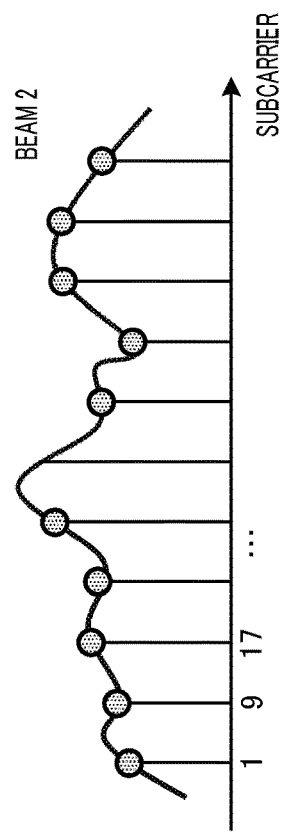
FIG. 6B illustrates an example of interpolation processing of channel information for beam 2 according to Embodiment 1.
Figure 6A:
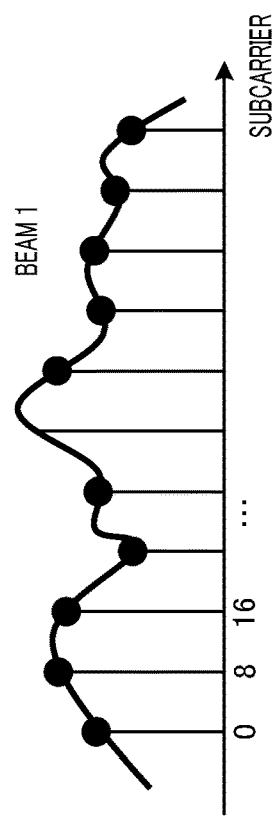
FIG. 6A illustrates an example of interpolation processing of channel information for beam 1 according to Embodiment 1.

For example, as shown in FIG. 4, user terminal 20 estimates channel information (equivalent channel matrix) H(k)W(k) (k represents a subcarrier number provided with the first reference signal) corresponding to the beams in part of the radio resources (radio resources of every Q subcarriers) to which the first reference signals corresponding to the beams are assigned. For example, in FIGS. 5A and 5B, channel information H(k)W(k) of every Q=8 subcarriers can be obtained for each beam (for example, beam 1 and beam 2). User terminal 20 executes processing of interpolating channel information H(k)W(k) estimated in part of the radio resources to compute channel information H(n)W(n) for the beams in the other radio resources as shown in FIGS. 6A and 6B. In this way, user terminal 20 can execute the processing of interpolating the channel information for the beams to reduce the number of first reference signals corresponding to the beams.

User terminal 20 then feeds back estimated channel information HW (channel estimation value of stage 1) to radio base station 10 (ST107).

Radio base station 10 generates precoding matrix (P) using fed back channel information HW (ST108).

Hereinafter, a generation method of precoding matrix (P) when, for example, BD is used will be described.

First, a generation method of precoding matrix ($P^{IUI}$) for the inter-user interference will be described.

The channel information (equivalent channel matrix) estimated by $N_U-1$ user terminals 20 in the channel estimation of stage 1 is expressed by the following equation 3.

(Equation 3)

$$\begin{bmatrix} H_0 \\ H_1 \\ \vdots \\ H_{N_U-1} \end{bmatrix} W = \begin{bmatrix} H_0 W \\ H_1 W \\ \vdots \\ H_{N_U-1} W \end{bmatrix} \quad [3]$$

Radio base station 10 computes a complement expressed by the following equation 4 regarding the equivalent channel matrix of x-th (x=0 to $N_U-1$) user terminal 20 indicated in equation 3.

(Equation 4)

$$\overline{H_x} W = \begin{bmatrix} H_0 W \\ \vdots \\ H_{x-1} W \\ H_{x+1} W \\ \vdots \\ H_{N_U-1} W \end{bmatrix} \quad [4]$$

Next, radio base station 10 performs singular value decomposition (SVD) expressed by equation 5 for the complement of the equivalent channel matrix indicated in equation 4.

(Equation 5)

$$\overline{H_x} W = \overline{U}_x \overline{\Sigma}_x [\overline{V}_x^{(1)} \overline{V}_x^{(0)}]^H \quad [5]$$

In equation 5, $\overline{V}_x^{(0)}$ represents an orthogonal vector for rejecting the signals of the streams of user terminals 20 other than x-th user terminal 20. Therefore, $\overline{V}_x^{(0)}$ of equation 5 is a component of precoding matrix ($P^{IUI}$) for the inter-user interference. Radio base station 10 also executes processing of obtaining $\overline{V}_x^{(0)}$ (that is, x=0 to $N_U-1$) of equation 5 for other user terminals 20 to generate precoding matrix ($P^{IUI}$) indicated in the following equation 6.

(Equation 6)

$$P^{IUI} = [\overline{V}_0^{(0)} \ldots \overline{V}_{N_U-1}^{(0)}] \quad [6]$$

Next, a generation method of precoding matrix ($P^{ISI}$) for the inter-stream interference will be described.

The equivalent channel matrix obtained by multiplying equivalent channel matrix HW estimated in the channel estimation of stage 1 in $N_U-1$ user terminals 20 by precoding matrix ($P^{IUI}$) indicated in equation 6 is expressed by the following equation 7.

(Equation 7)

$$\begin{bmatrix} H_0 \\ H_1 \\ \vdots \\ H_{N_U-1} \end{bmatrix} W P^{IUI} = \begin{bmatrix} \tilde{H}_0 & & 0 \\ & \tilde{H}_1 & \\ & & \ddots \\ 0 & & \tilde{H}_{N_U-1} \end{bmatrix} \quad [7]$$

Radio base station 10 performs singular value decomposition (SVD) expressed by the following equation 8 for the equivalent channel matrix indicated in equation 7.

(Equation 8)

$$\tilde{H}_x = U_x \Sigma_x [V_x^{(1)} V_x^{(0)}]^H \quad [8]$$

In equation 8, $V_x^{(0)}$ is component ($P_x^{ISI}$) of the precoding matrix for the inter-stream interference in x-th user terminal 20. Radio base station 10 also executes processing of obtaining $V_x^{(0)}$ (that is, x=0 to $N_U-1$) of equation 8 for other user terminals 20 to generate precoding matrix ($P^{ISI}$) indicated in the following equation 9.

(Equation 9)

$$P^{ISI} = \begin{bmatrix} P_0^{ISI} & & 0 \\ & P_1^{ISI} & \\ & & \ddots \\ 0 & & P_{N_U-1}^{ISI} \end{bmatrix} = \begin{bmatrix} V_0^{(0)} & & 0 \\ & V_1^{(0)} & \\ & & \ddots \\ 0 & & V_{N_U-1}^{(0)} \end{bmatrix} \quad [9]$$

The generation processing of precoding matrix (P) when, for example, BD is used has been described. In this way, radio base station 10 generates precoding matrices ($P^{IUI}$, $P^{ISI}$) based on the channel information (equivalent channel matrix including BF weight) estimated by using the first reference signals subjected to beamforming in the channel estimation of stage 1.

With reference again to FIG. 3, radio base station 10 multiplies the second reference signals by precoding matrix (P) and BF weight (W) and transmits the second reference signals to user terminal 20 (ST109). For example, as shown in FIG. 4, the second reference signals corresponding to antennas 201 (for example, first antenna, second antenna, . . . ) of user terminal 20 may be assigned to the radio resources (for example, subcarriers) based on frequency-division multiplexing such that the second reference signals are orthogonal among the antennas. The second reference signals multiplied by precoding matrix ($P^{IUI}$) are transmitted while the inter-user interference is avoided as described above.

Next, user terminal 20 estimates channel information (HWP) (that is, channel estimation of stage 2) using the second reference signals (ST110).

For example, as shown in FIG. 4, user terminal 20 estimates channel information (equivalent channel matrix) H(l)W(l)P(l) (l represents a subcarrier number provided with second reference signal) corresponding to antennas 201 in part of the radio resources (radio resources of every Q' subcarriers) to which the second reference signals corresponding to antennas 201 are assigned. User terminal 20 executes processing of interpolating channel information H(l)W(l)P(l) estimated in part of the radio resources to compute channel information H(n)W(n)P(n) for antennas 201 in the other radio resources. In this way, user terminal 20 can execute the processing of interpolating the channel information for antennas 201 to reduce the number of second reference signals corresponding to antennas 201.

Next, user terminal 20 generates postcoding matrix ($B^{ISI}$) using estimated channel information HWP (that is, channel estimation value of stage 2) (ST111).

Hereinafter, generation processing of postcoding matrix ($B^{ISI}$) when, for example, BD is used will be described.

The channel information (equivalent channel matrix) estimated by user terminal 20 in the channel estimation of stage 2 is expressed by the following equation 10.

(Equation 10)

$$\begin{bmatrix} H_0 \\ H_1 \\ \vdots \\ H_{N_U-1} \end{bmatrix} WP^{IUI}P^{ISI} = \begin{bmatrix} \tilde{H}_0 P_0^{ISI} & & & 0 \\ & \tilde{H}_1 P_1^{ISI} & & \\ & & \ddots & \\ 0 & & & \tilde{H}_{N_U-1} P_{N_U-1}^{ISI} \end{bmatrix} \quad [10]$$

It can be recognized from equation 10 that the inter-user interference is already rejected in $HWP^{IUI}P^{ISI}$ (that is, equivalent to HWP).

Next, x-th (x=0 to $N_U$−1) user terminal 20 performs singular value decomposition (SVD) expressed by the following equation 11 for the equivalent channel matrix indicated in equation 10.

(Equation 11)

$$\tilde{H}_x P_0^{ISI} = U_x \Sigma_x [V'_x{}^{(1)} V'_x{}^{(0)}]^H \quad [11]$$

As indicated in the following equation 12, x-th user terminal 20 generates postcoding matrix ($B^{ISI}$) that is matrix $U_x^H$ for canceling $U_x$ indicated in equation 11.

(Equation 12)

$$B_x^{ISI} = U_x^H \quad [12]$$

The generation processing of postcoding matrix ($B^{ISI}$) has been described. In this way, user terminal 20 generates postcoding matrix ($B^{ISI}$) based on the channel information (equivalent channel matrix including BF weight and precoding matrix) estimated by using the second reference signals subjected to precoding and beamforming in the channel estimation of stage 2.

With reference again to FIG. 3, radio base station 10 multiplies the signals (data) of the streams by precoding matrix (P) and BF weight (W) and transmits the signals of the streams to user terminal 20 (ST112). The data multiplied by precoding matrix ($P^{IUI}$) is transmitted while the inter-user interference is avoided as described above.

User terminal 20 multiplies the received signals of the streams by postcoding matrix ($B^{ISI}$) to demodulate the signals (data) of the streams (ST113). The inter-stream interference is rejected as described above in the data multiplied by precoding matrix ($P^{ISI}$) and postcoding matrix ($B^{ISI}$).

Note that in SU (Single-User)-MIMO transmission, user terminal 20 can execute processing of applying singular value decomposition (SVD) to equivalent channel matrix HW acquired in the channel estimation of stage 1 to acquire postcoding matrix ($B^{ISI}$). Therefore, the channel estimation of stage 2 in ST109 and ST110 shown in FIG. 3 may be performed in the MU-MIMO transmission.

<Advantageous Effects of Present Embodiment>

In this way, the channel estimation processing of the present embodiment includes stage 1 for estimating the channel information using the first reference signals subjected to beamforming in order to generate the precoding matrix and stage 2 for estimating the channel information using the second reference signals subjected to precoding and beamforming in order to generate the postcoding matrix.

According to the configuration, radio base station 10 can acquire equivalent channel matrix HW including the BF weight in stage 1. User terminal 20 can also acquire equivalent channel matrix HWP including the BF weight and the precoding matrix in stage 2.

Therefore, according to the present embodiment, radio base station 10 can acquire all of the channel information necessary for the precoding and postcoding processing. The processing allows radio base station 10 to accurately generate precoding matrix (P) using the channel information acquired in stage 1. User terminal 20 can also accurately generate postcoding matrix ($B^{ISI}$) using the channel information acquired in stage 2 (that is, channel information related to user terminal 20 in which the inter-user interference is prevented by precoding ($P^{IUI}$)).

According to the present embodiment, radio base station 10 selects the BF weight based on the SNR measured by user terminal 20 using the discovery signals and transmits the first reference signals multiplied by the BF weight to user terminal 20. User terminal 20 estimates the channel information using the received first reference signals. The processing allows radio base station 10 to accurately generate the BF weight and the precoding matrix using the discovery signals and the first reference signals transmitted by using larger power than user terminal 20, and the efficiency of the MU-MIMO transmission can be improved.

Note that the BF weight is selected based on the SNR in the case described in the present embodiment. However, the BF weight may be selected based on some candidate weight information (such as reception correlation) measured by using the discovery signals multiplied by the BF weight candidates, instead of the SNR.

Embodiment 2

The first reference signals used in the channel estimation of stage 1 are transmitted from the radio base station to the user terminal in the downlink in the case described in Embodiment 1. On the other hand, the first reference signals used in the channel estimation of stage 1 are transmitted from the user terminal to the radio base station in the uplink in the case described in the present embodiment.

Figure 7:
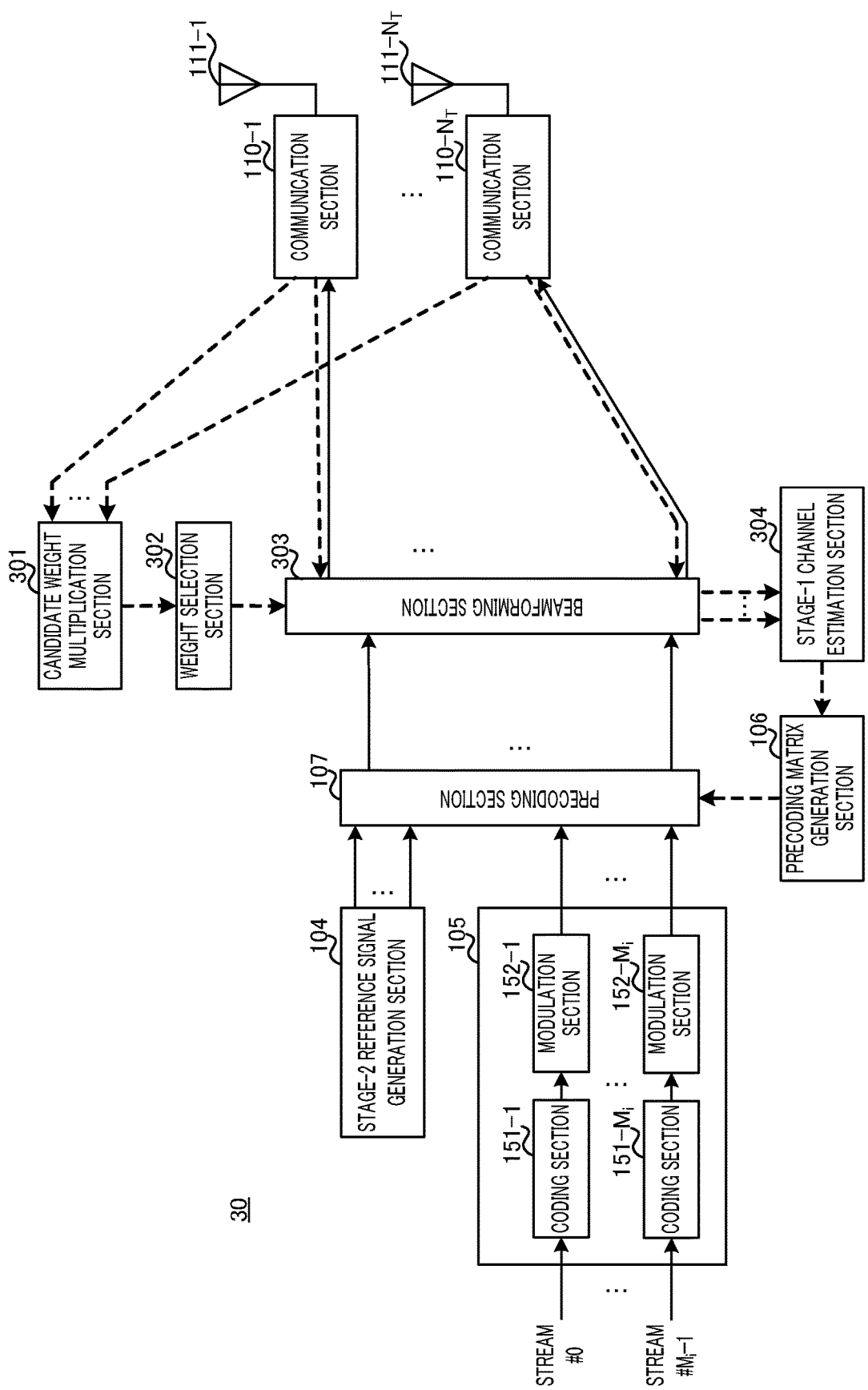
FIG. 7 is a block diagram showing a configuration example of a radio base station according to Embodiment 2.
Figure 8:
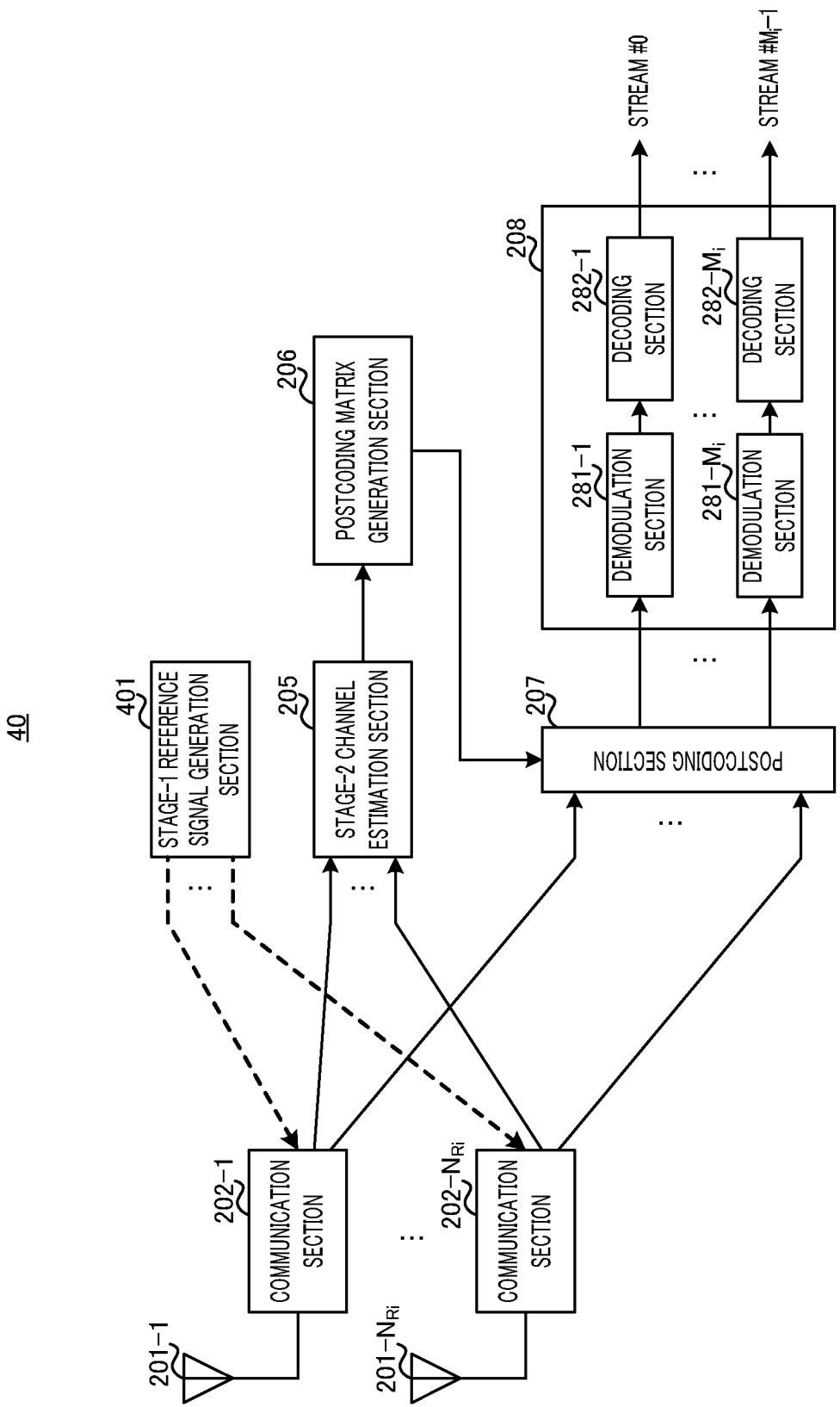
FIG. 8 is a block diagram showing a configuration example of a user terminal according to Embodiment 2.

A radio communication system according to the present embodiment at least includes radio base station 30 shown in FIG. 7 and at least one user terminal 40 shown in FIG. 8. Each user terminal 40 is connected to radio base station 30.

In FIGS. 7 and 8, dashed arrows indicate input and output of signals in the uplink transmission, and solid arrows indicate input and output of signals in the downlink transmission. FIG. 8 illustrates an example of a configuration of i-th user terminal 40.

Note that in radio base station 30 shown in FIG. 7 and user terminal 40 shown in FIG. 8, the same components as in Embodiment 1 (FIGS. 1 and 2) are provided with the same reference signs, and the description will not be repeated. In FIG. 7, constituent sections (for example, IFFT processing section and CP adding section) and the like for generating the OFDM signal in radio base station 30 are not illustrated. Similarly, constituent sections (for example, CP removing section and FFT processing section) and the like for receiving the OFDM signal in user terminal 40 are not illustrated in FIG. 8.

Radio base station 30 shown in FIG. 7 does not include discovery signal generation section 101 illustrated in Embodiment 1. User terminal 40 shown in FIG. 8 does not include candidate weight information measurement section 203 and stage-1 channel estimation section 204 illustrated in Embodiment 1.

In user terminal 40 shown in FIG. 8, stage-1 reference signal generation section 401 generates the first reference signals used in the channel estimation of stage 1. The first reference signals are transmitted to radio base station 30 through, for example, communication sections 202-1 to 202-N$_{Ri}$. Therefore, the first reference signals are transmitted from a plurality of antennas 201 of a plurality of user terminals 40 to radio base station 30. Note that the first reference signals transmitted from user terminal 40 are not multiplied by BF weight (W) and precoding matrix (P).

For example, in TDD (Time Division Duplex) transmission, the downlink and the uplink are reciprocal. Therefore, for example, in the TDD transmission, radio base station 30 can estimate the channel information of the downlink using the first reference signals transmitted in the uplink.

Communication sections 110-1 to 110-N$_T$ of radio base station 30 shown in FIG. 7 receive the first reference signals transmitted from a plurality of user terminals 40 through antennas 111-1 to 111-N$_T$ in the channel estimation of stage 1 and output the first reference signals to candidate weight multiplication section 301 and beamforming section 303.

Candidate weight multiplication section 301 multiplies the first reference signals input from communication sections 110-1 to 110-N$_T$ by the candidates of the BF weight, respectively, and outputs the first reference signals multiplied by the BF weight candidates to weight selection section 302.

Weight selection section 302 selects BF weight (W) to be used for beamforming from the BF weight candidates using the first reference signals input from candidate weight multiplication section 301 and outputs BF weight (W) to beamforming section 303. For example, weight selection section 302 may measure the SNR using the first reference signals and select, in descending order of SNR, L (the number of beams) BF weights not overlapping with each other.

Beamforming section 303 multiplies the first reference signals input from communication sections 110-1 to 110-N$_T$ by the BF weight input from weight selection section 302 in the channel estimation of stage 1 and outputs the first reference signals after the BF weight multiplication to stage-1 channel estimation section 304.

Stage-1 channel estimation section 304 estimates the channel information using the first reference signals input from beamforming section 303. The first reference signals are multiplied by BF weight (W) in beamforming section 303. Therefore, stage-1 channel estimation section 304 estimates equivalent channel information (equivalent channel matrix HW) including the BF weight. Stage-1 channel estimation section 304 outputs the estimated channel information (HW) to precoding matrix generation section 106.

Therefore, the same first reference signals are used to select the BF weight and estimate the channel of stage 1 in the present embodiment. In other words, the first reference signals transmitted in the uplink play a role of the discovery signals for selecting the BF weight in addition to the channel estimation of stage 1.

<Operation of Radio Base Station 30 and User Terminal 40>

Next, operation of radio base station 30 and user terminal 40 will be described in detail.

Figure 9:
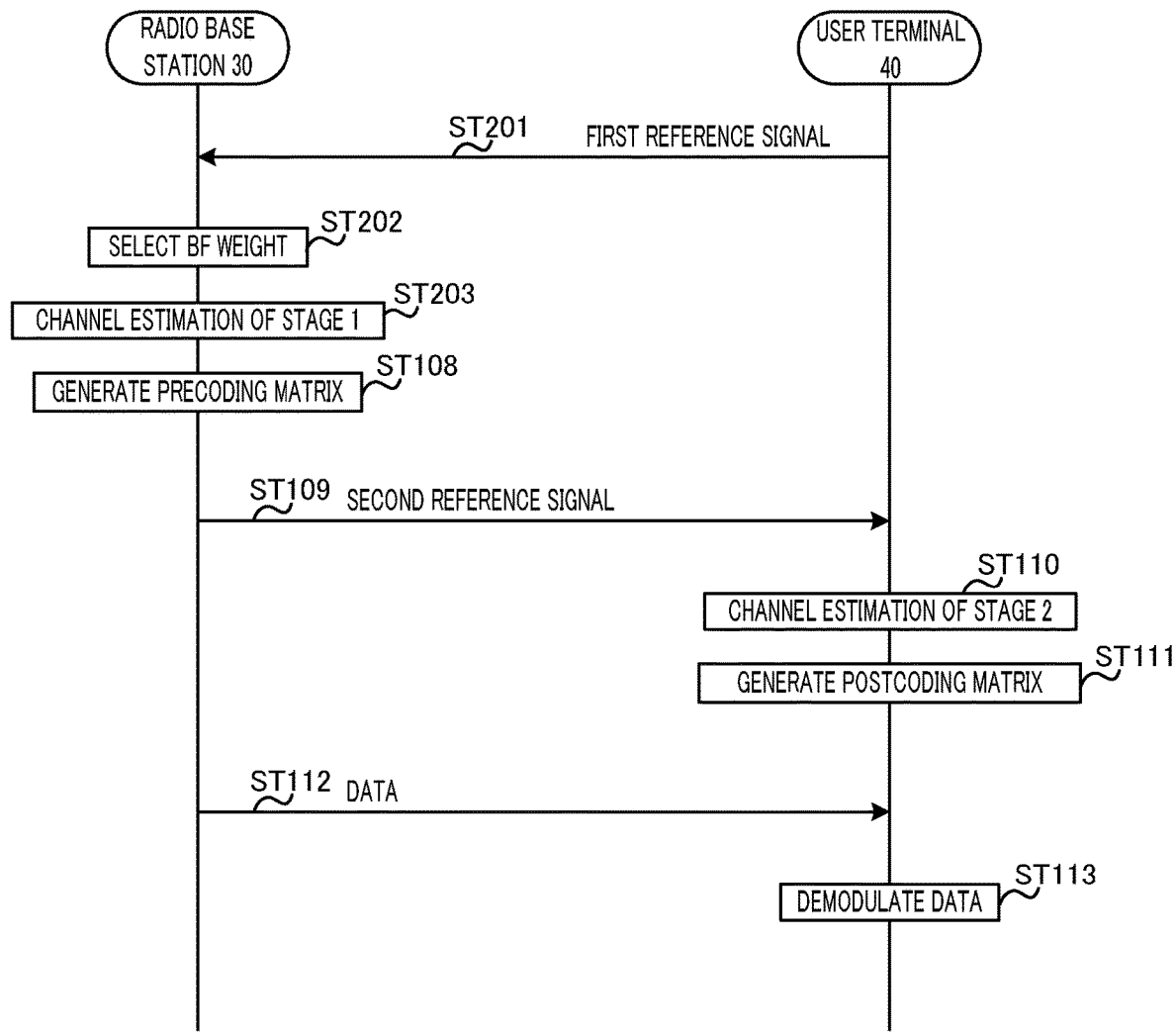
FIG. 9 is a sequence diagram showing an operation example of the radio base station and the user terminal according to Embodiment 2.

FIG. 9 is a sequence diagram illustrating operation of radio base station 30 and user terminal 40 according to the present embodiment. Note that in FIG. 9, the same processing as in Embodiment 1 (FIG. 3) are provided with the same reference signs, and the description will not be repeated.

Figure 10:
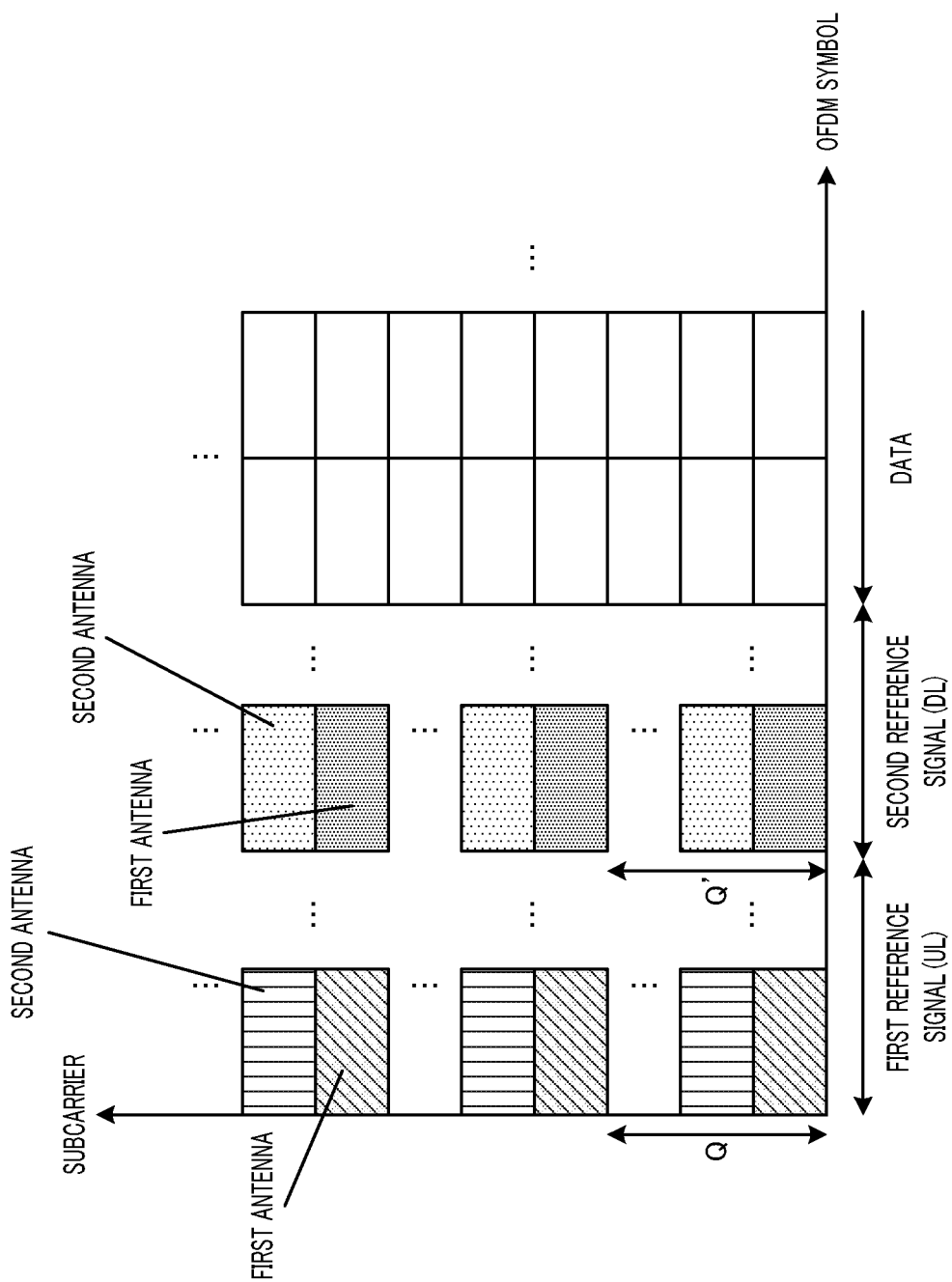
FIG. 10 illustrates a frame configuration example according to Embodiment 2.
Figure 11:
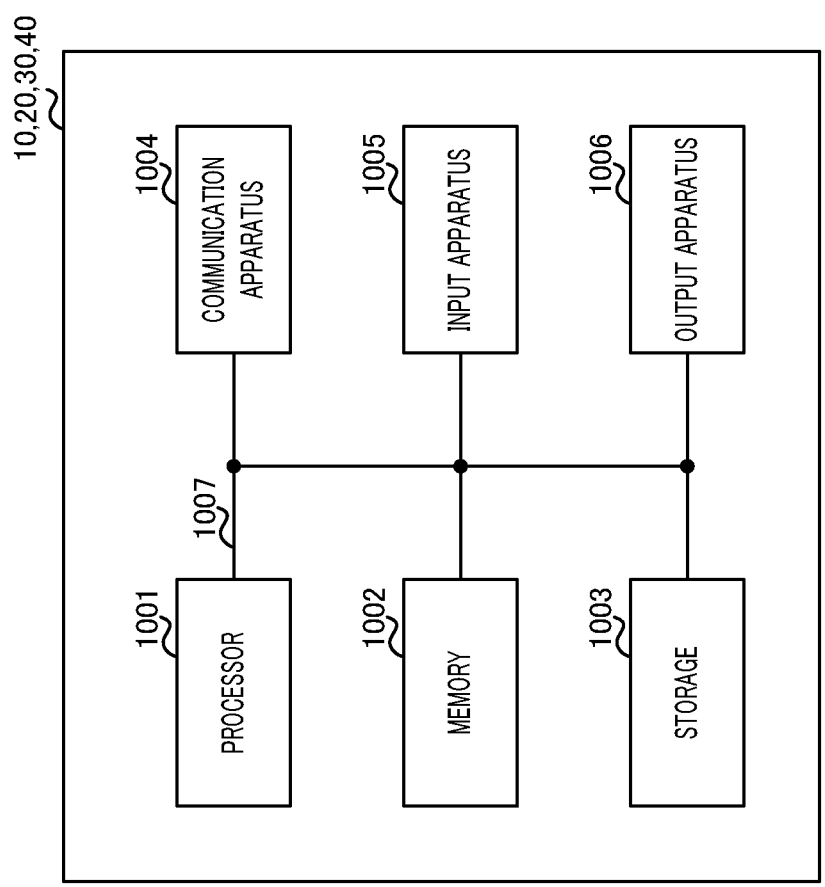
FIG. 11 illustrates an example of a hardware configuration of the radio base station and the user terminal according to the present invention.

FIG. 10 illustrates a frame configuration example in the present embodiment.

First, user terminal 40 transmits the first reference signals to radio base station 30 (ST201). The first reference signals to which neither the BF weight nor the precoding is applied, are transmitted. For example, as shown in FIG. 10, the first reference signals respectively corresponding to all of antennas 201 (for example, first antenna, second antenna, . . . ) included in a plurality of user terminals 40 in the MU-MIMO transmission may be assigned to the radio resources (for example, subcarriers) based on frequency-division multiplexing such that the first reference signals are orthogonal among antennas 201.

Next, radio base station 30 multiplies the first reference signals transmitted from user terminal 40 by the BF weight candidates, respectively, and selects the BF weight to be used for beamforming from the BF weight candidates using the first reference signals multiplied by the BF weights (ST202).

Next, radio base station 30 multiplies the first reference signals transmitted from user terminal 40 by selected BF weight (W) and estimates channel information (HW) (that is, channel estimation of stage 1) using the first reference signals after the BF weight multiplication (ST203).

For example, as shown in FIG. 10, radio base station 30 estimates channel information (equivalent channel matrix) H(k)W(k) (k represents a subcarrier number to which the first reference signal is assigned) corresponding to the antennas 201 in part of the radio resources (radio resources of every Q subcarriers) to which the first reference signals corresponding to antennas 201 are assigned. Radio base station 30 executes processing of interpolating channel information H(k)W(k) estimated in part of the radio resources to compute channel information H(n)W(n) for antennas 201 in the other radio resources. In this way, radio base station 30 can execute the processing of interpolating the channel information for antennas 201 to reduce the number of first reference signals corresponding to antennas 201.

The subsequent processing (channel estimation of stage 2) is the same as in Embodiment 1.

In this way, in the present embodiment, the first reference signals are transmitted from user terminal 40 to radio base station 30 in the uplink in the channel estimation of stage 1. Radio base station 30 selects the BF weight and generates the precoding matrix using the received first reference signals. As a result of the processing, the transmission and reception of the discovery signals and the SNR as in Embodiment 1 are not necessary in the present embodiment. The feedback of channel information (HW) of stage 1 as in Embodiment 1 is also not necessary in the present embodiment. Therefore, according to the present embodiment, the use of the radio resources in the channel estimation processing can be reduced more than in Embodiment 1.

According to the present embodiment, as in Embodiment 1, the channel estimation processing includes stage 1 for estimating the channel information using the first reference signals subjected to beamforming in order to generate the precoding matrix and stage 2 for estimating the channel information using the second reference signals subjected to precoding and beamforming in order to generate the postcoding matrix. Therefore, according to the present embodiment, radio base station 30 can acquire equivalent channel matrix HW including the BF weight in stage 1 as in Embodiment 1. Furthermore, user terminal 40 can acquire equivalent channel matrix HWP including the BF weight and the precoding matrix for all of antennas 201 of a plurality of user terminals 40 in the MU-MIMO transmission in stage 2.

Therefore, according to the present embodiment, radio base station 30 can acquire all of the channel information necessary for the precoding and postcoding processing. The processing allows radio base station 30 to accurately generate precoding matrix (P) using the channel information acquired in stage 1. User terminal 40 can accurately generate postcoding matrix ($B^{ISI}$) using the channel information acquired in stage 2 (that is, channel information related to user terminal 40 in which the inter-user interference is prevented by precoding ($P^{IUI}$)).

Note that as in Embodiment 1, the BF weight is selected based on the SNR in the case described in the present embodiment. However, the BF weight may be selected based on some candidate weight information (such as reception correlation) measured by using the discovery signals multiplied by the BF weight candidates, instead of the SNR.

This completes the description of embodiments.

Although the frequency-division multiplexing is applied to the first reference signals and the second reference signals in the cases illustrated in FIGS. 4 and 10, time-division multiplexing may be applied after dividing the first reference signals and the second reference signals into a plurality of OFDM symbols or subframes, or code-division multiplexing may be applied. The frequency-division, the time-division, and the code-division may be combined to multiplex the signals.

The first reference signals are used to perform the channel estimation of stage 1, and the second reference signals are used to perform the channel estimation of stage 2 in the cases described in Embodiments. However, the channel estimation values (channel information) may be acquired without using the first reference signals or the second reference signals in the channel estimation of stage 1 or the channel estimation of stage 2. More specifically, it is only necessary to acquire the channel information indicating equivalent channel matrix (HW) including the BF weight in the channel estimation of stage 1, and it is only necessary to acquire the channel information indicating equivalent channel matrix (HWP) including the precoding matrix and the BF weight in the channel estimation of stage 2. For example, the channel estimation of stage 2 may be performed based on blind channel estimation for obtaining channel information from the relationship between the reception data and the signal point disposition.

(Hardware Configuration)

Note that the block diagrams used to describe the embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, wired and/or wireless) connected, and the plurality of apparatuses may realize the functional blocks.

For example, the radio base station, the user terminal, and the like according to one embodiment of the present invention may function as a computer that executes processing of a radio communication method of the present invention. FIG. 10 illustrates an example of a hardware configuration of the radio base station and the user terminal according to one Embodiment of the present invention. Radio base stations 10 and 30 and user terminals 20 and 40 may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base stations 10 and 30 and user terminals 20 and 40 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by other methods. Note that processor 1001 may be provided by one or more chips.

The functions of radio base stations 10 and 30 and user terminals 20 and 40 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be constituted by a central processing unit (CPU) including an interface for peripheral apparatus, a control apparatus, an operation apparatus, a register, and the like. For example, discovery signal generation section 101, candidate weight multiplication sections 102 and 301, stage-1 reference signal generation section 103, stage-2 reference signal generation section 104, data generation section 105, precoding matrix generation section 106, precoding section 107, weight selection sections 108 and 302, beamforming sections 109 and 303, stage-1 channel estimation section 304, candidate weight information measurement section 203, stage-1 channel estimation section 204, stage-2 channel estimation section 205, postcoding matrix generation section 206, postcoding section 207, data reception section 208, stage-1 reference signal generation section 401, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in the embodiments. For example, at least part of the functional blocks constituting radio base stations 10 and 30 and user terminals 20 and 40 may be realized by a control program stored in memory 1002 and operated by processor 1001, and the other functional blocks may also be similarly realized. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be constituted by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be constituted by, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, communication sections 110 and 202, antennas 111 and 201, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base stations 10 and 30 and user terminals 20 and 40 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

(Notification and Signaling of Information)

The notification of information is not limited to the modes and embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations performed by the base station (radio base station) in the specification may be performed by an upper node depending on the situation. Various operations performed for communication with a terminal in a network constituted by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Judgement Method)

The judgement may be made based on a value expressed by 1 bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

The terms "determining" and "deciding" used in the present specification may include a variety of operations. "Determining" and "deciding" can include, for example, cases in which judging, calculating, computing, processing, deriving, investigating, looking up (for example, looking up in a table, a database, or another data structure), and ascertaining are assumed as "determining" and "deciding." "Determining" and "deciding" can also include cases in which receiving (for example, receiving information), transmitting (for example, transmitting information), inputting, outputting, and accessing (for example, accessing data in the memory) are assumed as "determining" and "deciding." "Determining" and "deciding" can also include cases in which resolving, selecting, choosing, establishing, comparing, and the like are assumed as "determining" and "deciding." Therefore, "determining" and "deciding" can include cases in which operations are assumed as "determining" and "deciding."

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be prescribed by the same name (for example, demodulation RS).

The description "based on" used in the present specification does not mean "only based on," unless otherwise specifically stated. In other words, the description "based on" means both of "only based on" and "at least based on."

The "section" in the configuration of each apparatus may be replaced with "means," "circuit," "device," or the like.

The terms "including," "comprising," and modifications of these are intended to be inclusive just like the term "having," as long as the terms are used in the present specification or the appended claims. Furthermore, the term "or" used in the present specification or the appended claims is not intended to be an exclusive or.

The radio frame may be constituted by one or a plurality of frames in the time domain. One or each of a plurality of frames may be called a subframe, a time unit, or the like in the time domain. The subframe may be further constituted by one or a plurality of slots in the time domain. The slot may be further constituted by one or a plurality of symbols (OFDM (Orthogonal Frequency Division Multiplexing) symbols, SC-FDMA (Single Carrier-Frequency Division Multiple Access) symbols, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station performs a scheduling for assigning radio resources to each mobile station (such as frequency bandwidth that can be used by each mobile station and transmission power). The minimum time unit of scheduling may be called a TTI (Transmission Time Interval).

For example, one subframe may be called a TTI. A plurality of continuous subframes may be called a TTI. One slot may be called a TTI.

The resource unit is a resource assignment unit of the time domain and the frequency domain, and the resource unit may include one or a plurality of continuous subcarriers in the frequency domain. One or a plurality of symbols may be included in the time domain of the resource unit, and the length may be one slot, one subframe, or one TTI. One TTI and one subframe may be constituted by one or a plurality of resource units. The resource unit may be called a resource block (RB), a physical resource block (PRB: Physical RB), a PRB pair, an RB pair, a scheduling unit, a frequency unit, or a subband. The resource unit may be constituted by one or a plurality of REs. For example, it is only necessary that one RE be a resource in a unit (for example, minimum resource unit) smaller than the resource unit serving as a resource assignment unit, and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to the embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-002338 filed on Jan. 11, 2017, and the entire content of Japanese Patent Application No. 2017-002338 is hereby incorporated by reference.

INDUSTRIAL APPLICABILITY

An aspect of the present invention is useful for a mobile communication system.

REFERENCE SIGNS LIST 10, 30 Radio base station
20, 40 User terminal
101 Discovery signal generation section
102, 301 Candidate weight multiplication section
103, 401 Stage-1 reference signal generation section
104 Stage-2 reference signal generation section
105 Data generation section
106 Precoding matrix generation section
107 Precoding section
108, 302 Weight selection section
109, 303 Beamforming section
110, 202 Communication section
111, 201 Antenna
151 Coding section
152 Modulation section
203 Candidate weight information measurement section
204, 304 Stage-1 channel estimation section
205 Stage-2 channel estimation section
206 Postcoding matrix generation section
207 Postcoding section
208 Data reception section
281 Demodulation section
282 Decoding section

The invention claimed is:

1. A user terminal in a radio communication system that performs precoding and postcoding, and beamforming in MU-MIMO transmission performed between a radio base station and a plurality of user terminals, the user terminal comprising:
   a communication section that receives a data signal to which the precoding based on first channel information indicating a channel between the radio base station and the user terminal, and the beamforming are applied, the channel being estimated in first channel estimation, the first channel information being an equivalent channel matrix including a beamforming weight;
   a channel estimation section that performs second channel estimation for estimating second channel information indicating a channel between the radio base station and the user terminal, the second channel information being an equivalent channel matrix including the beamforming weight and a precoding matrix; and
   a postcoding section that performs the postcoding on the data signal based on the second channel information.

2. The user terminal according to claim 1, further comprising
   a measurement section that measures candidate weight information using one or more discovery signals transmitted from the radio base station, the one or more discovery signals being multiplied by candidates of the beamforming weight, respectively,
   wherein the channel estimation section estimates the first channel information using one or more first reference signals transmitted from the radio base station, the one or more first reference signals being subjected to the beamforming by using the beamforming weight decided based on the candidate weight information, and
   the communication section transmits the first channel information to the radio base station.

3. The user terminal according to claim 2, wherein:
   the first reference signals correspond respectively to a plurality of beams formed by the beamforming, the first reference signals are multiplexed and transmitted such that the first reference signals are orthogonal among the beams, and
   the channel estimation section estimates the first channel information for the beams in part of radio resources to which the first reference signals corresponding to the beams are assigned, and interpolates the first channel information estimated in the part of the radio resources to compute the first channel information for the beams in another radio resource.

4. The user terminal according to claim 1, wherein:
   the communication section transmits, to the radio base station, the one or more first reference signals to which neither of the beamforming nor the precoding is applied.

5. The user terminal according to claim 4, wherein:
the one or more first reference signals correspond to all antennas included in the plurality of user terminals, respectively, the one or more first reference signals are multiplexed and transmitted such that the one or more first reference signals are orthogonal among all of the antennas,
the first channel information for the antennas is estimated in part of radio resources to which the one or more first reference signals corresponding to the antennas are assigned, and the first channel information estimated in the part of the radio resources is interpolated to compute the first channel information for the antennas in the other radio resource.

6. The user terminal according to claim 1, wherein:
the communication section receives one or more second reference signals multiplied by the beamforming weight and the precoding matrix from the radio base station, the one or more second reference signals corresponding respectively to a plurality of antennas included in the user terminals, the one or more second reference signals being multiplexed and transmitted such that the one or more second reference signals are orthogonal among the antennas, and
the channel estimation section estimates the second channel information for the antennas in part of radio resources to which the one or more second reference signals corresponding to the antennas are assigned, and interpolates the second channel information estimated in the part of the radio resources to compute the second channel information for the antennas in the other radio resource.

7. A radio communication method in a radio communication system that performs precoding and postcoding, and beamforming in MU-MIMO transmission performed between a radio base station and a plurality of user terminals, the radio communication method comprising:
receiving a data signal to which the precoding based on first channel information indicating a channel between the radio base station and the user terminal and the beamforming are applied, the channel being estimated in first channel estimation, the first channel information being an equivalent channel matrix including a beamforming weight;
performing second channel estimation for estimating second channel information indicating a channel between the radio base station and the user terminal, the second channel information being an equivalent channel matrix including the beamforming weight and a precoding matrix; and
performing the postcoding on the data signal based on the second channel information.

* * * * *